O. B. Olmsted,

Adjustable Stove Pipe Shelf.

No. 3,656. Reissued Sep. 28. 1869.

Witnesses;
D. W. Coates
S. L. Colley

Inventor;
O. B. Olmsted

N. PETERS, PHOTO-LITHOGRAPHER, WASHINGTON, D. C.

UNITED STATES PATENT OFFICE.

O. B. OLMSTED, OF BELOIT, WISCONSIN.

IMPROVED ADJUSTABLE STOVE-PIPE SHELF.

Specification forming part of Letters Patent No. 67,900, dated August 20, 1867; Reissue No. 3,656, dated September 28, 1869.

*To all whom it may concern:*

Be it known that I, O. B. OLMSTED, of the city of Beloit, county of Rock, in the State of Wisconsin, have invented certain new and useful Improvements in Shelves to be Attached to Stove-Pipes; and I do hereby declare that the following description, in connection with the original drawings, forming a part of my said Letters Patent herewith presented for reissue, is sufficient to enable any person skilled in the art or science to which it most nearly appertains to make and use my said invention or improvements without further invention or experiment.

The nature of my said invention and improvements consists in providing a convenient portable shelf to be attached to stove-pipes, (chiefly cooking-stoves,) on which many articles of cookery may be placed, and thus kept warm for a late dinner, the tea-kettle and coffee-pot warmed thereon, and is convenient for many other useful purposes, such as drying fruits and the like.

Figure 1:
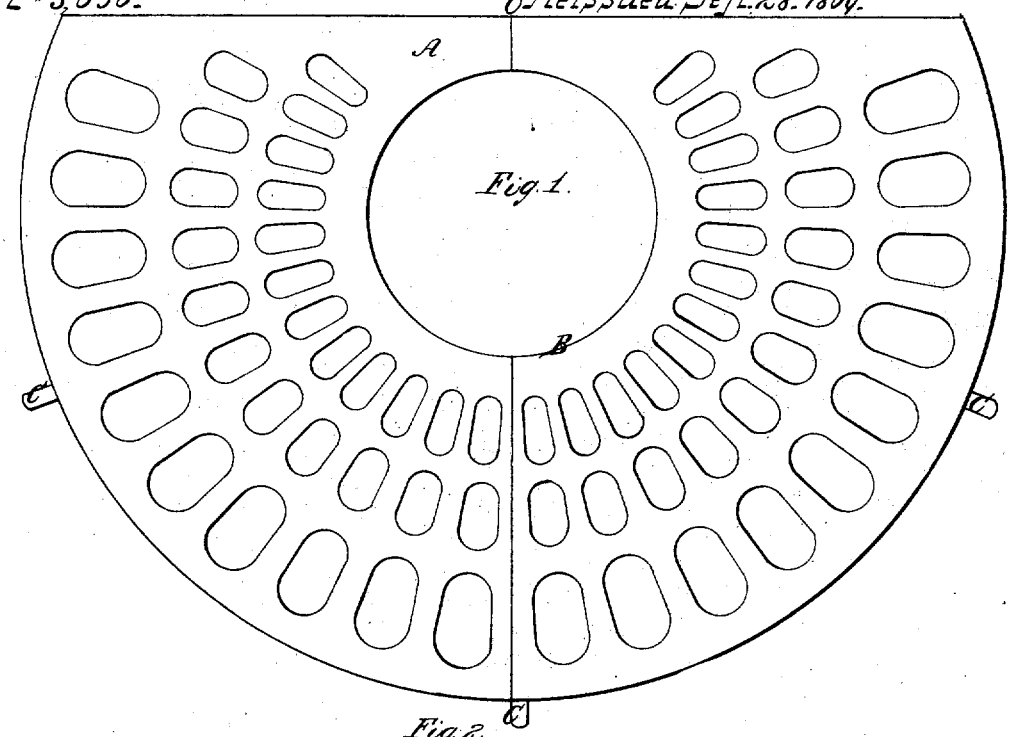
Figure 2:
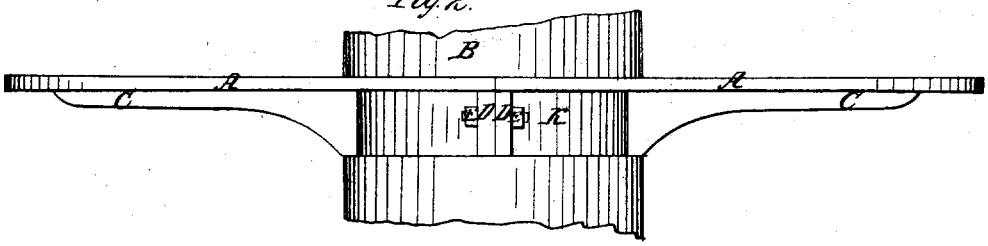
Figure 3:
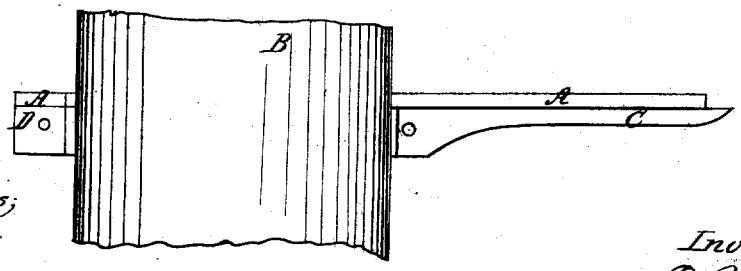

In the drawings, Figure 1 is a perspective view of the shelf complete, as attached to the pipe of a stove. Fig. 2 is a horizontal view of the shelf, taken from the rear or flat side of the shelf, showing the manner of securing the shelf to the pipe; and Fig. 3 is a similar view of the shelf, taken in the line of C to C, Fig. 1, by the dividing-line of the shelf, as shown in said Fig. 1.

Similar letters of reference indicate like parts.

A represents the disk of the shelf, which is made of open-work. In the drawings I have shown it as perforated with oblong openings; but it may be cast in open-work of any design, the advantages being greater lightness and better transmission of heat.

C C are ribs for sustaining the shelf, attached to and forming part of the collar K and shelf A.

The shelf and collar combined is made in two parts, and secured to the stove-pipe B by suitable bolts and nuts, which bolts pass through the projections D D of the collar K, as shown in Figs. 2 and 3. By loosening the said bolts the shelf may be raised or lowered, at the pleasure of the house-keeper.

The projections C C, Fig. 1, are convenient on which to hang stove implements, &c.

This shelf may be made of cast or sheet metal.

What I claim as my invention and improvements, and desire to secure by Letters Patent, is—

1. A stove-pipe shelf encircling the stove-pipe, made or cast of metal in open-work of any design, substantially as described.
2. An improved stove pipe shelf constructed in two parts, substantially as described.
3. In combination with the foregoing, the collar K, with the projections D D, as and for the purpose specified.
4. The ribs C C, when the whole is constructed substantially as herein set forth, for the purpose specified.

O. B. OLMSTED.

Witnesses:

W. TATTERSHALL,
A. I. BATTIN.